United States Patent
Jonas et al.

[15] 3,694,427
[45] Sept. 26, 1972

[54] CURABLE SILOXANOL-SILACYCLOBUTANE COMPOSITION

[72] Inventors: David Andrew Jonas; William John Owen, both of Glamorgan, Wales

[73] Assignee: Dow Corning Limited, London, England

[22] Filed: March 12, 1971

[21] Appl. No.: 123,862

[52] U.S. Cl. ............260/18 S, 117/161 ZA, 156/329, 161/193, 260/37 SB, 260/46.5 G, 260/46.5 P
[51] Int. Cl. ................................................C08f 21/01
[58] Field of Search.............260/46.5 P, 46.5 G, 18 S

[56] References Cited

UNITED STATES PATENTS 3,445,495    5/1969    Nelson.....................260/448.2

Primary Examiner—Donald E. Czaja
Assistant Examiner—M. I. Marquis
Attorney—Robert F. Fleming, Jr., Laurence R. Hobey, Harry D. Dingman and Howard W. Hermann

[57] ABSTRACT

Siloxane polymers containing an average of at least two hydroxyl groups bonded to silicon in each molecule can be cured employing silacyclobutanes of the general formula

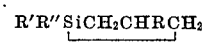

$$R'R''SiCH_2CHRCH_2$$

where R is H or alkyl of one to six carbons, R' and R'' are each hydrocarbyl, halogenohydrocarbyl or a radical reactive with ≡SiOH, at least one R' or R'' being such a reactive radical. The composition can be illustrated by a mixture of hydroxyl endblocked dimethylpolysiloxane and 1,1-dimethoxy-1-silacyclobutane. The products are useful as silicone rubbers, resins and adhesives.

9 Claims, No Drawings

CURABLE SILOXANOL-SILACYCLOBUTANE COMPOSITION

This invention introduces a curable organosilicon composition based on a hydroxylated organopolysiloxane and a silacyclobutane containing at least one group reactive with ≡ SiOH and bonded to silicon.

Several methods for curing organosiloxane polymers are known in the art. Linear siloxane polymers can be vulcanized and cured to form elastomers and cross-linked, non-linear siloxane polymers can be cured to form resinous materials employing organic peroxides, per-esters, high energy radiation and other free radical initiators, with heat being required in some cases and merely a cure accelerator in others. Siloxane resins containing ≡ SiOH groups can be cured employing organometallic catalysts and heat (e.g., 140° C. and above). Linear organosiloxane polymers having hydroxyl substituents, usually as endblockers, admixed with polyfunctional organosilicon compounds such as alkylsilicates, alkyl polysilicates, acyloxysilanes, aminosilanes and others, can be mixed with a variety of known condensation catalysts and the mixtures will cure in the presence of water. Thus, a variety of systems are known for curing siloxane polymers.

It is an object of the present invention to introduce a novel curing catalyst for siloxane polymers containing hydroxyl groups bonded to silicon. A novel method for curing siloxanols is also an object. A further object is a novel cured siloxane polymer system. Other objects and advantages of this invention are detailed in or will be apparent from the disclosure and claims.

The present invention is directed to a mixture of (A) an organosiloxane polymer containing an average of at least two hydroxyl groups bonded to silicon in each molecule and (B) a silacyclobutane of the general formula

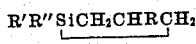

where R is H or an alkyl radical of one to six carbon atoms (i.e., $C_pH_{2p+1}$ where $p$ is 1 to 6), R' is an atom or radical reactive with the HOSi ≡ groups in (A), R" is a hydrocarbyl radical or halogenohydrocarbyl radical of one to 30 carbon atoms or an atom or radical reactive with the HOSi ≡ groups in (A).

The organosiloxane polymer (A) can be any homopolymer or copolymer having an average of at least two hydroxyl groups bonded to silicon in each molecule. The operative polymers can vary from low molecular weight fluids (e.g., HO(Me$_2$SiO)$_3$H, where Me is —CH$_3$) to high molecular weight solvent soluble resins and gum-like linear polymers. These polymers are made up of units of the general formula ZSiO$_{3/2}$, Z$_2$SiO, Z$_3$SiO$_{1/2}$ and SiO$_{4/2}$ where Z is a hydrocarbyl radical, halogenohydrocarbyl radical, aminoalkyl radical, cyanoalkyl radical, methacryloxyalkyl radical, alkoxyalkyl radical or other well known substituted hydrocarbon radical as previously known in the organosilicon art. Preferably, the average ratio of Z/Si is in the range from 1.0 to 2.00 and, of course, the operable polymers must contain an average of at least two hydroxyl groups bonded to silicon ( ≡ SiOH) per molecule.

The organic substituents in the siloxane polymers (represented by Z above) can be hydrocarbyl radicals such as alkyl, cycloaliphatic, alkenyl, aryl, aralkyl and alkaryl as these terms are generally employed in the organosilicon art, as well as halogenated derivatives of such hydrocarbyl radicals, aminoalkyl, cyanoalkyl, methacryloxyalkyl and other substituted hydrocarbon radicals well known in the art (e.g., see U.S. Pats. Nos. 3,532,731, 3,474,064, 3,261,803, 3,445,420 and such well known texts on organosilicon chemistry as those by Eaborn, Noll and Rochow). The preferred organopolysiloxanes are those wherein the organic substituents are methyl, vinyl, phenyl, 3,3,3-trifluoropropyl, aminoalkyl, N-aminoalkyl(aminoalkyl) and cyanoalkyl. Most preferred are those siloxane polymers wherein at least 50 percent of the organic substituents are methyl radicals and/or phenyl radicals, the remaining organic substituents being individually present in amounts not exceeding about 10 percent of the total substituents.

Of primary interest herein are those linear siloxane polymers which are curable to form elastomers, hence, have a Z/Si ratio in the range from 1.9/1 to 2.0/1. These polymers can be generally represented by the formula HO(Z$_2$SiO)$_y$H where $y$ has a value such that the polymer has a viscosity in the range from 500 cs. at 25° C. to gum-like polymers of $10^6$ cs. at 25° C. or even higher. For such linear polymers, it is preferred that at least 50 percent of the radicals represented by Z should be —CH$_3$ groups with the balance of the Z groups, preferably less than 25 percent, being vinyl, phenyl and/or CF$_3$CH$_2$CH$_2$—.

In the general formula of the silacyclobutane component (B) employed herein, R' is an atom or radical reactive with HOSi ≡ . R" may also be a reactive group as defined for R' but may also be a hydrocarbyl or halogenohydrocarbyl radical of one to 30 carbon atoms, as these terms are generally defined in the art (i.e., alkyl, aryl, alkenyl, aralkyl, alkaryl, cycloaliphatic and halogenated derivatives thereof). Preferably, both R' and R" are reactive with the HOSi ≡ groups in polymer (A) and are halogen atoms, alkoxy radicals of one to five carbon atoms, acyloxy radicals of less than seven carbon atoms, or amino radicals such as NH$_2$, NHCH$_3$, N(CH$_3$)$_2$ and N(CH$_3$)(C$_2$H$_5$). The use of silacyclobutanes where R' or both R' and R" are, for example, halogen atoms, acyloxy radicals or amino radicals can lead to the liberation of acidic or basic by-products in the product. The presence of such acidic or basic by-products in the ultimate product may be objectionable, for example, where corrosion of metal substrates is a consideration, and for this reason the preferred silacyclobutanes wherein the reactive groups are alkoxy radicals, e.g., —OCH$_3$ and —OC$_2$H$_5$.

The silacyclobutanes wherein R' or R' and R" are halogen atoms are known and those where R' and R" are alkoxy, amino or acetoxy radicals are derived from the known halogenated silacyclobutanes by alkoxylation with an alkyl orthoformate, by reaction with an organic amine and by other recognized organic reaction mechanisms.

The curable composition of this invention is prepared by mixing the organosiloxane polymer (A) with the silacyclobutane (B) in any desired manner. The proportions of (A) and (B) employed will depend upon the degree of crosslinking desired in the finished product. When 0.1 percent by weight of (B) based on the weight of (A) is employed, the degree of crosslinking attained will be relatively small. High crosslink density is achieved employing up to 50 percent by weight of (B) based on the weight of (A). In general, the preferred amount of silacyclobutane (B) is in the range from 0.1 to 10 percent and most preferred is 0.5 to 5.0 percent of (B) based on the weight of (A). In general, it is preferred to employ at least sufficient of the silacyclobutane (B) to provide a curable composition containing equimolar proportions of silanol groups in organosiloxane (A) and silanol reactive groups (R' or R' and R'') in the silacyclobutane (B).

The mixture of siloxane polymer (A) and silacyclobutane (B) can be converted to a cured, crosslinked product by heating the mixture to a temperature in the range from about 180° C. to the decomposition temperature of the components. A curing temperature in the range from 200° to 220° C. is generally preferred because the mixture will usually cure in 5 to 30 minutes in this temperature range.

A further embodiment of the invention involves contacting the mixture of (A) and (B) with one or more substances which will effect opening of the silacyclobutane ring. This embodiment is a preferred method of operation because it enables the cure of the organosiloxane polymer to be carried out at temperatures lower than those noted above and/or reduces the cure time for the organopolysiloxanes. Thus, in some cases, the cure temperature can be reduced to around room temperature (i.e., a range of 15° to 35°C.). Therefore, included within the scope of this invention is a curable composition which is a mixture of the defined organosiloxane polymer (A), the defined silacyclobutane (B), and (C) a substance which is effective in promoting the opening of the silacyclobutane ring.

Several materials are known to be useful in promoting the opening of the silacyclobutane ring. Such materials include chloroplatinic acid and the various chloroplatinic acid complexes known in the art as well as aluminum chloride. Preferred for this purpose herein, however, are the organometallic compounds such as stannous octoate, stannous acetate, dibutyltin dilaurate, dibutyltin diacetate and dicobalt octacarbonyl. Other materials which may be used as component (C) are acids, bases, acid clays and fume silica. The proportion of component (C) employed is not critical and will depend to some extent upon its chemical reactivity and physical properties. In general, however, from about 0.5 to 5.0 percent by weight based on the weight of (A) and (B) will produce the desired results.

When R' or both R' and R'' are alkoxy radicals, curing of the mixture of (A) and (B) can be expedited by addition to the mixture of a material which catalyzes the reaction of $\equiv$ SiOH + $C_pH_{2p+1}OSi \equiv$ . A wide variety of such catalysts is known in the art and many of such catalysts also promote the opening of the silacyclobutanes (e.g., the tin carboxylates, acids and bases). The use of a catalyst specifically for effecting the reaction between the $\equiv$ SiOH groups in (A) and alkoxy radicals in (B) is not, however, thought to confer any significant advantage. This reaction will usually proceed readily and rapidly at room temperature or slightly elevated temperatures in the absence of any added catalyst. In fact, the mixture of (A) and (B) will thicken gradually and this is believed to be due to the condensation reaction. If such spontaneous thickening is undesirable, the ingredients (A) and (B) should be packaged separately and admixed just prior to use.

The compositions of this invention can be employed in any application requiring a curable organopolysiloxane composition. Such applications include elastomeric products, resinous coatings, films and laminates, as well as adhesives. The compositions can be used per se or compounded with fillers (e.g., quartz, diatomaceous earth, zirconium silicates, aluminas, silicas, carbon blacks, solvents, pigments, heat stability additives and other well-known additives in the organosiloxane art). They are particularly useful as potting compounds, sealing materials, adhesives, laminating resins, coatings and electrical insulation.

The following examples are included to illustrate the invention and do not limit the scope of the invention which is delineated in the appended claims. All parts and percentages are based on weight unless otherwise stated.

EXAMPLE 1

A mixture was prepared by admixing and stirring 125 parts of a hydroxyl endblocked dimethylsiloxane polymer having a molecular weight of about 10,000, 1 part of 1,1-dimethoxy-1-silacyclobutane and 1 part of dibutyltin dilaurate. The mixture was allowed to remain exposed to the atmosphere for 48 hours at room temperature after which time it was found to have cured to form a firm, elastomeric product.

EXAMPLE 2

A curable composition was prepared by mixing together 300 parts of a hydroxyl endblocked polydimethylsiloxane having a molecular weight of approximately 45,000, 1 part of 1,1-dimethoxy-1-silacyclobutane, 0.5 parts each of dibutyltin dilaurate and dicobalt octacarbonyl and 60 parts of diatomaceous earth. The mixture was poured into a mold where it set in 24 hours at room temperature to produce a strong rubber.

EXAMPLE 3

12.5 parts of a hydroxyl endblocked polydimethylsiloxane having a molecular weight of approximately 25,000 was mixed with 1 part of 1,1-dimethoxy-1-silacyclobutane. To 10 parts of this mixture was then added 0.1 part of a mixture of equal parts of tetrakis(triphenylphosphine)platinum and dibutyltin dilaurate. The composition set to a rubbery mass when heated at 80° C. for 15 minutes.

EXAMPLE 4

A composition was prepared as described in Example 3 except that dicobalt octacarbonyl was used in place of the platinum compound. This composition set to a rubber after being heated for 6 hours at 80° C.

EXAMPLE 5

When 100 parts of a hydroxyl endblocked copolymer of 75 mol percent dimethylsiloxane, 24 mol percent phenylmethylsiloxane and 1 mol percent methylvinylsiloxane was admixed with 3 parts 1-methoxy-1-sila-3-methyl-cyclobutane and the resulting mixture was heated at 210° C. for 4 hours, a tough elastomeric product was obtained.

EXAMPLE 6

When 100 parts of a methylsiloxane resin having an average methyl/silicon ratio of 1.3/1 and containing 3 percent residual hydroxyl groups bonded to silicon was admixed with 1-methoxy-1-ethoxy-1-sila-3-methyl-cyclobutane and the mixture was heated at 220° C., a cured, tough resin was obtained.

EXAMPLE 7

Equivalent results were achieved when Example 1 was repeated employing in place of the 1,1-dimethoxy-1-silacyclobutane, any of the following:

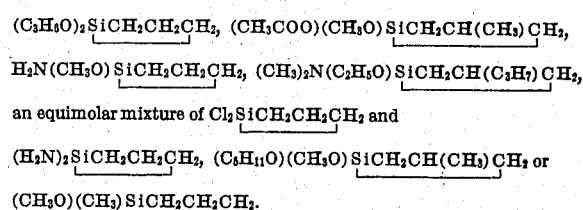

EXAMPLE 8

Equivalent results were achieved when Example 6 was repeated employing a methylphenylsiloxane resin having a methyl/silicon ratio of 0.8/1, a phenyl/silicon ratio of 0.5/1, containing 3 percent hydroxyl groups bonded to silicon, having a viscosity of 35,000 cs. at 25° C.

EXAMPLE 9

When Example 6 was repeated employing 2 parts by weight of stannous octoate, the resin cured at 140° C. to form a hard coating. When fiber glass fabric was impregnated with this system and laid-up to form laminates, the laminates cured under moderate pressure at 140° C. to form tough, resilient laminates.

That which is claimed is:

1. A curable composition consisting essentially of a mixture of (A) an organopolysiloxane having an average of at least two ≡SiOH groups per molecule and made up of units selected from $ZSiO_{3/2}$, $Z_2SiO$, $Z_3SiO_{1/2}$ and $SiO_{4/2}$ where each Z is a hydrocarbyl radical, halogenohydrocarbyl radical, aminoalkyl radical, cyanoalkyl radical, methacryloxy alkyl radical or alkoxyalkyl radical, the average ratio of Z radicals to Si atoms in the organopolysiloxane being in the range from 1/1 to 2/1 and (B) a silacyclobutane of the general formula

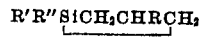

wherein R represents a hydrogen atom or an alkyl atom having less than seven carbon atoms and R' is a radical or atom reactive with the ≡SiOH groups in (A) and selected from the group consisting of halogen atoms, alkoxy radicals of one to five carbon atoms, acyloxy radicals of less than seven carbon atoms and amino radicals and R'' is a monovalent hydrocarbon radical or a monovalent halogenated hydrocarbon radical of one to 18 carbon atoms or an atom or radical reactive with the ≡SiOH group in (A) as defined for R' above.

2. A composition as claimed in claim 1 wherein at least 50 percent of the organic radicals in the organopolysiloxane (A) are methyl radicals, phenyl radicals or a mixture thereof.

3. A composition as claimed in claim 1 wherein the organopolysiloxane (A) is a diorganopolysiloxane having terminal silicon-bonded hydroxyl radicals.

4. A composition as claimed in claim 3 wherein the diorganopolysiloxane has the general formula $HO(Z_2SiO)_yH$ wherein y is an integer such that the viscosity of the diorganopolysiloxane is greater than 500 cs. at 25° C. and the Z radicals are predominantly methyl radicals, any remaining Z radicals being phenyl and/or vinyl radicals.

5. A composition as claimed in claim 1 wherein R' and R'' are alkoxy radicals having less than six carbon atoms.

6. A composition as claimed in claim 1 wherein (B) is present in a proportion of from 0.5 to 5 percent by weight based on the weight of (A).

7. A composition as claimed in claim 1 in which there is also incorporated (C) a material which is effective in promoting the opening of the silacyclobutane ring structure and is selected from the group consisting of chloroplatinic acid, chloroplatinic acid complexes, aluminum chloride, organometallic compounds, acids, bases, acid clays and fume silica.

8. A composition as claimed in claim 7 wherein (C) is an organometallic compound selected from the group consisting of stannous octoate, stannous acetate, dibutyl tin dilaurate, dibutyl tin diacetate and dicobalt octacarbonyl.

9. A composition as claimed in claim 1 also containing (C) a tin carboxylate.

* * * * *